United States Patent Office 2,702,046
Patented Feb. 15, 1955

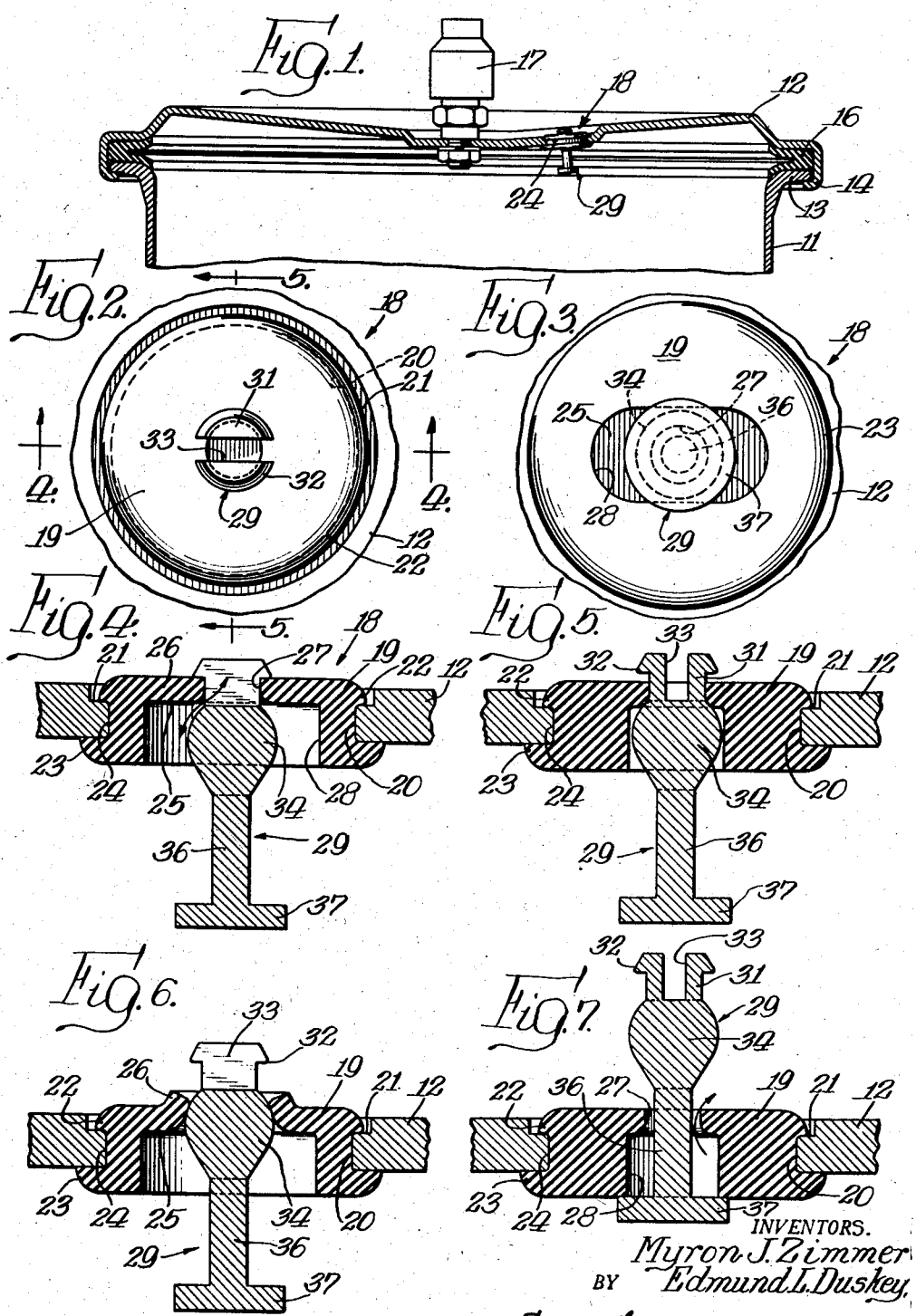

2,702,046

SAFETY PLUG FOR PRESSURE COOKERS

Myron J. Zimmer, Wood Dale, and Edmund L. Duskey, Western Springs, Ill., assignors to Ekco Products Company, Chicago, Ill., a corporation of Illinois Application June 15, 1948, Serial No. 33,046

1 Claim. (Cl. 137—467)

This invention relates to pressure release devices or safety plugs for use in the walls of pressure chambers, and more particularly to an improved pressure relief plug for releasing excess pressure in a pressure cooker.

A pressure cooker of the type adapted for home use is usually provided with a spring-actuated safety valve designed to be manipulated manually or to operate automatically when the pressure within the cooker exceeds a predetermined maximum. However, it occasionally happens that such a spring-actuated pressure release becomes plugged or other wise rendered inoperative by an accumulation of food or other matter from within the cooker. Thus, although such instances of valve failure are rare, it is extremely important that some additional pressure relief device be provided to function in such an emergency in order to avoid damage to the cooker and possible injury to the attendant or operator.

Several types of auxiliary or emergency pressure release devices have been suggested in the prior art, the most common form comprising essentially a distortable rubber disk or plug mounted in an aperture in a wall of the cooker, such as in the cover, and designed to be released or expelled when the internal pressure in the cooker reaches an excessive value. It will be apparent that a certain degree of danger is inherent in the operation of such a safety plug since the plug is often blown out with considerable force. Furthermore, since the plug is blown free of the cooker whenever excess pressure is released therefrom, it becomes necessary to search th adjacent area to recover the plug for reinstallation, and in many cases the plug can be reinserted satisfactorily only by disassembling the cover and the body of the cooker.

Accordingly, it is a primary object of the present invention to provide a pressure relief plug which may function to release excess pressure from a pressure chamber, such as a pressure cooker, without being expelled completely from the cooker.

A further object of the invention is to provide, in a pressure cooker or the like, a pressure relief plug which functions to release excess pressure and which may thereafter be simply and readily reset for normal cooker operation.

Another object of the invention is to provide, in a pressure cooker or the like, a unitary pressure relief plug having two independent pressure releasing means, one of which functions at a predetermined excess pressure and the other of which functions at a greater excess pressure in the event that the first mentioned means fails to operate.

An additional object of the invention is to provide, in a pressure cooker or the like, a pressure relief plug having a deformable member and a movable member whereby, under a predetermined excess pressure, the movable member may be forced through the deformable member to release said excess pressure but, in the event of improper functioning of the device, the entire plug may be expelled from the cooker under a greater predetermined excess pressure.

Still another object of the invention is to provide, in a pressure cooker or the like, a pressure relief plug having a pressure vent and a movable closure member, said vent being open during initial heating of the cooker to permit the escape of entrapped air and said vent also being open during cooling off of the cooker to permit the entry of air and thereby prevent vacuum formation, and said movable member being adapted to seal said vent under normal operating pressure and to be forced through said vent under a predetermined excess pressure.

Other objects and advantages of the invention will become apparent from the subsequent description taken in connection with the accompanying drawings, in which:

Fig. 1 is a fragmentary, vertical, sectional view of a pressure cooker having a cover provided with a safety plug embodying the features of the invention and showing the cover of the cooker in closed position;

Fig. 2 is an enlarged, fragmentary, top plan view showing the plug in position in the cover;

Fig. 3 is an enlarged, fragmentary, bottom plan view of the plug;

Fig. 4 is an enlarged, vertical, sectional view of the safety plug and the adjacent portions of the cover taken along the line 4—4 of Fig. 2 and showing the operation of the plug when the pressure within the cooker is atmospheric or less;

Fig. 5 is an enlarged, vertical, sectional view similar to Fig. 4 but taken at 90° with respect thereto along the line 5—5 of Fig. 2 and showing the operation of the plug under normal cooking pressure;

Fig. 6 is an enlarged, vertical, sectional view similar to Fig. 4 and showing deformation of the safety plug just prior to the release of excess pressure from the cooker; and Fig. 7 is an enlarged, vertical, sectional view similar to Fig. 5 and showing the relative locations of the parts of the plug when in position for releasing excess pressure.

In general, the pressure relief plug of our invention comprises a deformable member and a movable member cooperating therewith. The deformable member is preferably in the form of a resilient or distortable disk adapted to be mounted in an opening in the cover of the pressure cooker and having a central aperture therethrough. The movable member preferably comprises an elongated closure member or insert disposed in the aperture in the deformable disk member and movable axially thereof. As described hereinafter in greater detail, the movable closure member is formed with an enlarged valve portion which, when the pressure within the cooker is atmospheric or less, remains in a nonsealing position out of engagement with the disk member whereby air may be vented from the interior of the cooker through the aperture in the disk member during initial heating of the cooker, and whereby atmospheric air may be admitted to the cooker through the aperture in the disk member during a cooling off period to avoid vacuum formation. Under normal cooking conditions, fluid pressure from within the cooker forces the movable closure member outwardly of the cooker bringing the enlarged valve portion into sealing engagement with the disk member in order to seal the aperture therein against loss of fluid pressure. In the event that the fluid pressure within the cooker exceeds a predetermined maximum, the enlarged valve portion is forced outwardly through the aperture in the deformable disk member whereby to release excess pressure from the cooker through said aperture, the movable member, however, being retained by the disk member.

Referring now to the drawings, we have shown in Fig. 1, merely by way of illustration, one particular type of pressure cooker comprising a body or receptacle 11 and a cover 12. In this particular cooker, the receptacle 11 is provided with an outwardly turned flange 13 and the cover 12 is provided with a depending and inwardly turned flange portion 14 adapted to be locked in tight engagement with the flange 13 by suitable adjustable locking means (not shown). A flexible gasket 16 is provided intermediate the cover 12 and the flange 13 on the body 11 in order to insure a pressure-tight seal therebetween. A conventional type of pressure release 17, such as a spring-operated relief valve, may be mounted centrally on the cover 12.

A safety plug embodying the features of our invention is indicated generally at 18 in Fig. 1 and comprises a resilient disk member 19 mounted in an opening 20 disposed in a recess or depression 21 in the cover 12. The disk 19 is preferably made of a synthetic rubber or similar rubber-like material which will not be affected adversely by heat within the temperature ranges normally encountered and which is resistant to oil and grease. The synthetic material known as "neoprene" has been found to be particularly satisfactory, although other similar rubber-like products may also be used.

The disk 19 is provided with an upper annular flange 22 and a lower annular flange 23 defining therebetween a peripheral groove 24 adapted to receive in snug relation therein the marginal portion of the cover 12 about the opening 20. The upper flange 22 overlaps the marginal edge of the opening 20 in the recessed portion 21 of the cover 12 only sufficiently to permit the disk 19 to be retained in the opening 20 under ordinary usage and handling. Thus, by so limiting the extent of the flange 22, the disk 19 may be readily inserted in the opening 20 from the inside of the cover 12 without extensive distortion of the disk. The lower flange portion 23 which engages the under surface of the cover 12 may overlap the marginal edge of the opening 20 to a greater extent than the upper flange 22 since, as hereinafter described in greater detail, it is this lower flange portion 23 of the disk 19 which retains the plug 18 in sealed engagement with the cover 12 during normal operation of the safety plug and which must be deformed or distorted in the event that the primary pressure releasing means should fail to function properly.

A central aperture or bore is provided in the disk 19 and is countersunk from its lower end to form a horizontal shoulder 25 which separates the aperture into an upper portion 27 of relatively reduced size and a lower portion 28 of relatively greater size, the annular portion of the disk 19 above the shoulder 25 being referred to as a lip portion 26. As best seen in the plan views of Figs. 2 and 3, the enlarged lower portion 28 of the aperture is non-circular and preferably generally elliptical or oval in cross-section, and the reduced upper portion 27 of the aperture above the shoulder 25 is of circular cross-section.

Extending through the central aperture in the disk 19 and movable axially thereof is a metal insert or closure member indicated generally at 29. The member 29 comprises an uppermost head portion 31 having an annular flange or rim 32 adapted to overlap and engage flatwise with the upper surface of the disk 19 around the circular portion 27 of the aperture. A transverse slot 33 is formed in the upper end or head portion 31 of the member 29 and extends diametrically thereacross. Immediately below the head portion 31 is an enlarged or bulged valve portion 34 having smooth curved side surfaces adapted to engage and seal the edges of the lip portion 26 of the disk member 19, as subsequently described. Depending from the valve portion 34 is an elongated shank or stem portion 36 of reduced diameter carrying at its lower end a retaining member in the form of a circular disk 37.

An important feature of our invention resides in the relative sizes of the various portions of the movable closure member 29 and the upper and lower portions 27 and 28 of the aperture in the disk member 19. As will be seen from Figs. 4 to 7, inclusive, the diameter of the head portion 31 is such as to provide a sliding fit in the circular portion 27 of the aperture in the disk member 19. The maximum diameter of the valve portion 34 is slightly less than the short dimension or axis of the elliptical portion 28 of the aperture in the disk member 19 (Fig. 5). The diameter of the stem portion 36 is less than the diameter of the circular upper portion 27 of the aperture. The diameter of the retainer 37 at the lower end of the stem 36 is slightly greater than the short dimension or axis of the elliptical portion 28 of the aperture (Fig. 3).

When the pressure cooker is in cold or relatively unheated condition, the movable closure member 29 occupies the position shown in Fig. 4, the rim portion 32 of the head 31 serving to position or support the member 29 and prevent it from dropping through the aperture 27 and becoming detached from the disk member 19. The lower end or bottom of the slot 33 in the head 31 extends below the shoulder 25 thereby providing a fluid passageway in open communication between the outside atmosphere and the interior of the cooker as illustrated by the arrows in Fig. 4. When the cooker is initially heated, it is highly desirable that atmospheric air entrapped within the cooker be permitted to escape since it has been found that air retained in the pressure cooker often has an undesirable or adverse effect on the flavor of the cooked food. By means of the pressure relief plug of our invention, the air within the cooker is vented through the slot 33 during the initial portion of the heating period, and as soon as the fluid pressure within the cooker increases appreciably above atmospheric pressure, the valve portion 34 of the member 29 is raised upwardly under said fluid pressure and brought into tight sealing engagement with the shoulder 25 thereby sealing the circular portion 27 of the aperture against loss of fluid pressure. This position of the member 19, i. e. the position under normal cooking pressures, is illustrated in Fig. 5.

In the event that the conventional pressure release valve 17 fails to operate and the fluid pressure within the cooker exceeds a predetermined maximum, such as about twenty-five pounds per square inch, the valve portion 34 of the member 29 causes the lip portion 26 of the disk 19 to be distorted or deformed outwardly thereby permitting the valve portion 34 to pass upwardly through the circular portion 27 of the aperture. In Fig. 6, the member 29 is shown in partially expelled position with the lip 26 being in deformed condition. In Fig. 7 the member 29 is shown in its uppermost position, the valve portion 34 having passed completely through the circular opening 27. In this position the member 29 is prevented from becoming completely detached or expelled from the disk 19 by engagement of the retainer 37 with the edges of the lower or elliptical portion 28 of the aperture (Figs. 3 and 7). In the latter position, excess fluid pressure may escape from the cooker through the elliptical aperture 28 around the edges of the retaining disk 37 and thence through the annular opening between the stem portion 36 and the circular aperture 27, as shown by the arrow in Fig. 7.

It has been found that if the distortion of the disk 19 necessary to permit the valve portion 34 to be forced through the aperture is confined substantially to the lip portion 26 and the material adjacent thereto, a more uniform operation of the plug is obtained. Thus, all disks manufactured of a given material and in a given mold will distort or deform at substantially the same excess pressure. To accomplish this result, we prefer that the aperture in the disk 19 be so countersunk that the shoulder 25 lies in substantially the same plane as the lower surface of the flange 22 which engages the upper surface of the cover 12 within the recess 21. By this construction the degree of lateral or radial deformation of the disk 19 necessary to permit the valve portion 34 to be forced therethrough is reduced to a minimum.

After the pressure relief plug 18 has functioned to release excess pressure in the manner shown in Fig. 7 and the movable member 29 is still in its uppermost position, the attendant or operator may readily reset the device for normal operation merely by pushing downwardly on the head portion 31 of the member 29 thereby forcing the valve portion 34 downwardly through the deformable lip portion 26 of the disk 19.

In addition to providing a fluid passageway for the venting of entrapped air during the initial heating period, the transverse slot 33 in the head 31 of the member 29 also serves another very useful and important function. During the cooling off period of the pressure cooker after the proper cooking time has elapsed, the vapors within the cooker condense with a resultant tendency toward vacuum formation within the cooker. However, in the pressure relief plug of our invention, the valve portion 34 recedes from the seated or sealing position shown in Fig. 5 to the non-sealing position shown in Fig. 4, as the pressure within the cooker decreases to atmospheric pressure, whereby air may enter from the outside atmosphere through the slot 33 and downwardly through the elliptical aperture 28 into the interior of the cooker, as shown by the arrow in Fig. 4, and thereby preventing vacuum formation.

Although the above described operation of the pressure relief plug 18 constitutes the normal means of releasing excess pressure, we have also provided a second emergency pressure releasing means. In the event that particles of food or other matter should plug or obstruct the aperture in the disk member 19 or otherwise interfere with the proper pressure releasing operation of the movable member 29, the entire disk member 19 may be forcibly expelled from the opening 20 in the cover 12, the lower flange portion 23 and the side walls of the disk member 19 being deformed inwardly below the shoulder 25 to permit the disk to be blown clear of the cover 12. The design of the resilient disk member 19 and the sealing flange portion 23 is such that the latter means of releasing excess pressure will be effective only at a somewhat higher predetermined excess pressure than the excess pressure at which the valve portion 34 is forced upwardly through the disk member 19.

It will be seen that our device provides a pressure relief plug operable to release excess pressure from the cooker and adapted to be reset for normal operation in a simple and expedient manner without the necessity of recovering an expelled part and reassembling the same in the wall of the cooker or its cover. Furthermore, our device provides a second or emergency means of pressure release in which the entire device, including the resilient disk member and the movable metal member mounted therein, is forcibly expelled from the cooker under a greater predetermined excess pressure. In addition, the pressure relief plug also functions to facilitate the escape of entrapped air from the cooker during an initial heating period and to permit the entry of atmospheric air into the cooker during a cooling off period whereby to avoid vacuum formation. Thus, the device combines many advantageous features in a simple unitary structure.

Although the invention has been described primarily in connection with one specific form of the device, it will be understood that various modifications and equivalent structures may be employed without departing from the scope of the invention as defined in the appended claim.

We claim:

A pressure relief plug for a pressure cooker or the like, comprising a resilient disk member of rubber-like material adapted to be mounted in an opening in the cover of the cooker, said disk member being provided with a central aperture countersunk at its lower end to form a shoulder, the portion of said aperture below said shoulder having a generally elliptical cross-section and the portion of said aperture above said shoulder having a circular cross-section of lesser diameter than the shorter diameter of said elliptical cross-section, and an elongated closure member located in said aperture and movable axially thereof, said closure member having an enlarged valve portion adapted to move upwardly, under fluid pressure into sealing engagement with said shoulder whereby to seal said aperture against loss of fluid pressure, said disk member being adapted to be deformed under a predetermined excess pressure whereby said valve portion may be forced upwardly through the circular portion of said aperture to permit the escape of said excess pressure, and said closure member having stem portion of reduced diameter depending from said valve portion and carrying a retaining disk at its lower end, said retaining disk being of slightly greater diameter than the shorter diameter of said elliptical cross-section whereby to engage said disk member adjacent the lower end of said aperture and thereby prevent said closure member from becoming detached from said disk member when in pressure releasing position, the elliptical form of the portion of said aperture below said shoulder providing a passage for fluid pressure release when said retaining disk is in engagement with the disk member.

References Cited in the file of this patent

UNITED STATES PATENTS

| Number | Name | Date |
|---|---|---|
| 360,781 | Nye | Apr. 5, 1887 |
| 701,607 | Park | June 3, 1902 |
| 1,313,554 | Nielsen | Aug. 19, 1919 |
| 1,475,554 | Salruc | Nov. 27, 1923 |
| 1,503,145 | Wentorf | July 29, 1924 |
| 2,160,398 | Crowley | May 30, 1939 |
| 2,270,332 | Osborn | Jan 20, 1942 |
| 2,276,502 | McCoy | Mar. 17, 1942 |
| 2,301,724 | Vischer | Nov. 10, 1942 |
| 2,428,483 | Wittenberg | Oct. 7, 1947 |
| 2,429,149 | Wittenberg | Oct. 14, 1947 |